US005860161A

United States Patent [19]
Hansen

[11] Patent Number: 5,860,161
[45] Date of Patent: Jan. 12, 1999

[54] MICROCONTROLLER CONFIGURED TO INDICATE INTERNAL MEMORY ACCESSES EXTERNALLY

[75] Inventor: John P. Hansen, Austin, Tex.

[73] Assignee: Advanced Micro Devices, Inc.

[21] Appl. No.: 696,735

[22] Filed: Aug. 14, 1996

[51] Int. Cl.$^6$ ........................................................ G06F 12/00
[52] U.S. Cl. ............................................ 711/211; 395/871
[58] Field of Search .................................. 711/211, 200; 395/800.39, 871

[56] References Cited

U.S. PATENT DOCUMENTS

| | | | |
|---|---|---|---|
| 4,349,870 | 9/1982 | Shaw et al. | 395/800.38 |
| 4,969,087 | 11/1990 | Tanagawa et al. | 398/800.38 |
| 5,371,869 | 12/1994 | Lee et al. | 395/559 |
| 5,504,903 | 4/1996 | Chen et al. | 395/651 |
| 5,548,794 | 8/1996 | Yishay et al. | 395/871 |
| 5,612,974 | 3/1997 | Astrachan | 375/295 |
| 5,623,687 | 4/1997 | Yishay et al. | 395/800.43 |
| 5,652,844 | 7/1997 | Harwood, III | 395/284 |
| 5,652,903 | 7/1997 | Weng et al. | 395/800.35 |
| 5,657,442 | 8/1997 | Groves | 345/429 |
| 5,680,581 | 10/1997 | Banno et al. | 395/186 |
| 5,685,005 | 11/1997 | Garde et al. | 395/800.36 |
| 5,704,034 | 12/1997 | Circello | 395/183.14 |

FOREIGN PATENT DOCUMENTS

| | | |
|---|---|---|
| 0 436 211 A2 | 7/1991 | European Pat. Off. . |
| 0 453 268 A2 | 10/1991 | European Pat. Off. . |
| 0 718 763 A1 | 6/1996 | European Pat. Off. . |

OTHER PUBLICATIONS

International Search Report for PCT/US 97/09541, dated Oct. 14, 1997.
Am 186™ EM/188™ User's Manual with Am186 Family Instruction Definitions, Advanced Micro Devices, Rev. 1, 1995, Chapter 5 "Chip Select Unit," pp. 5–1 through 5–12.

Primary Examiner—Tod R. Swann
Assistant Examiner—Christopher S. Chow
Attorney, Agent, or Firm—Kevin L. Daffer; Lawrence J. Merkel; Conley, Rose & Tayon

[57] ABSTRACT

A microcontroller integrates a memory accessible by the processor core. Additionally, the microcontroller provides an indication upon an external bus that memory accesses mapped to the integrated memory are occurring, independent of the enablement status of the memory. The indication provides a ready identification of internal access cycles. In one embodiment, the indication is multiplex with a control signal upon the external bus. The microcontroller further employs a show read bus transfer, which may be optionally enabled by the user. The show read bus transfer transmits upon the external bus the read data being provided from the internal memory to a core. The cycle is presented with identical functional timing to normal read cycles. Additionally, the A/C timings of the show read bus transfer are consistent with external read transfers. Therefore, external circuitry (such as an in-circuit emulator) may capture the data from the show read bus transfer using the same circuitry used to capture external read data. The show read bus transfer may be enabled by setting a configuration register bit within the microcontroller, or by asserting a signal upon a predefined pin at the conclusion of reset of the microcontroller. By providing the predefined pin for activating the show read mode of the microcontroller, the microcontroller may be placed into show read mode for debug purposes without changing the instruction code being executed thereon.

23 Claims, 12 Drawing Sheets

MICROCONTROLLER CONFIGURED TO INDICATE INTERNAL MEMORY ACCESSES EXTERNALLY

BACKGROUND OF THE INVENTION

1. Field of the Invention

This invention relates to the field of microcontrollers and, more particularly, to microcontrollers having an integrated internal memory.

2. Description of the Relevant Art

Integrated circuits have become ubiquitous in modern society. Products as diverse as automobiles, computer systems, televisions and telephones incorporate one or more integrated circuits to perform various functions. Generally speaking, an integrated circuit comprises circuitry formed upon a single monolithic semiconductor substrate. The integrated circuit implements one or more cores which perform the various functions of the integrated circuit as well as circuitry for communicating with other integrated circuits and devices external to the integrated circuit. A core is circuitry connected together to provide a desired high level function. For example, a processor core is circuitry which executes a set of instructions. Other cores may be a digital signal processing core configured to process signals, a cache controller core for managing a block of external memory as a cache, etc.

One popular type of integrated circuit is a microcontroller, which comprises a processor core as well as communications cores for various serial and parallel port connections to peripheral devices. Microcontrollers allow programmable control (via the processor core) of the peripherals connected thereto. Microcontrollers are commonly employed in a wide variety of devices including printers, cellular phones, automobiles, etc. Generally, a microcontroller is employed as the primary control chip in an electronic circuit embedded within a product other than a general purpose computer system (i.e. the so-called "embedded applications"). The microcontroller and related circuitry is employed to satisfy the computing demands of a product whose general purpose is not computing (i.e. a television, telephone, or automobile).

Modern microcontrollers incorporate not only a processor core and communications cores, but also integrate other devices commonly employed therewith. Particularly, microcontrollers have begun to integrate blocks of memory. Integrating previously discrete components such as memory may lead to cost savings in the final product, since fewer components are needed. Unfortunately, integration may complicate debugging during product development. Since the integrated components within the microcontroller communicate with each other via internal buses not accessible external to the microcontroller, the observability of a user to the activity between the integrated components is reduced as compared to a discrete component implementation.

Particularly, while developing the instruction code to be executed by the microcontroller, debugging becomes more complicated when the memory is internal to the microcontroller. External monitoring of the microcontroller no longer reveals all information regarding the memory accesses occurring to the internal memory, nor the data being transferred in response to the memory accesses. If the instruction code is not performing as the user expects, the user is at a loss to determine the cause. Many microcontroller architectures (such as the 80C186 architecture) allow for operands to be directly accessed from memory locations. Therefore, if a memory operand is erroneous and the memory is internal to the microcontroller, a user may have to expend onerous efforts to detect the problem. For example, the instruction code may need to be modified to insert instructions for checking the values stored in a given location. Changing the code may change the dynamics of the program execution, potentially hiding the problem by changing the circumstances in which the problem occurs. It is therefore desirable to have increased visibility to the internal communications of a microcontroller with integrated internal memory.

SUMMARY OF THE INVENTION

The problems outlined above are in large part solved by a microcontroller as disclosed herein. The microcontroller integrates a memory accessible by the cores included thereon. Additionally the microcontroller provides an indication upon an external bus that accesses to the integrated memory are occurring. The indication advantageously provides a ready identification of internal access cycles. Observability is increased for a user to the internal operations of the microcontroller. In one embodiment, the indication is multiplexed with a control signal upon the external bus. In this manner, additional pins are not added to the microcontroller to support providing the indication. Advantageously, costs for manufacturing the microcontroller may remain fixed even though the capabilities of the microcontroller are increased.

The microcontroller described herein further employs a show read bus transfer, which may be optionally enabled by the user. The show read bus transfer transmits upon the external bus the read data being provided from the internal memory to a core. Advantageously, data which normally is transferred internal to the microcontroller is visible external to the microcontroller. Furthermore, the cycle is presented with identical functional timing to normal read cycles. Additionally, the A/C timings of the show read bus transfer are consistent with external read transfers. Therefore, external circuitry (such as an in-circuit emulator) may capture the data from the show read bus transfer using the same circuitry used to capture external read data.

The show read bus transfer may be enabled by setting a configuration register bit within the microcontroller, or by asserting a signal upon a predefined pin at the conclusion of reset of the microcontroller. By providing the predefined pin for activating the show read mode of the microcontroller, the microcontroller may be placed into show read mode for debug purposes without changing the instruction code being executed thereon. Therefore, debugging may be performed under the same circumstances as the instruction code executes in normal (non-show-read) mode.

Broadly speaking, the present invention contemplates an integrated circuit comprising a core, an internal memory, and a bus interface unit. The internal memory is coupled to the core for storing data for use by the core. Coupled to the core and the internal memory, the bus interface unit is configured to indicate an access by the core to the internal memory such that the access is detectable external to the integrated circuit.

The present invention further contemplates a method for operating an integrated circuit. A memory internal to the integrated circuit is accessed. An indication that the memory is being accessed is conveyed upon at least one pin of the integrated circuit.

The present invention still further contemplates a system comprising an external memory and an integrated circuit. The integrated circuit is coupled to the external memory and includes an internal memory. Additionally, the integrated circuit comprises at least one pin upon which the integrated circuit indicates an access to the internal memory.

BRIEF DESCRIPTION OF THE DRAWINGS

Other objects and advantages of the invention will become apparent upon reading the following detailed description and upon reference to the accompanying drawings in which.

Figure 1:
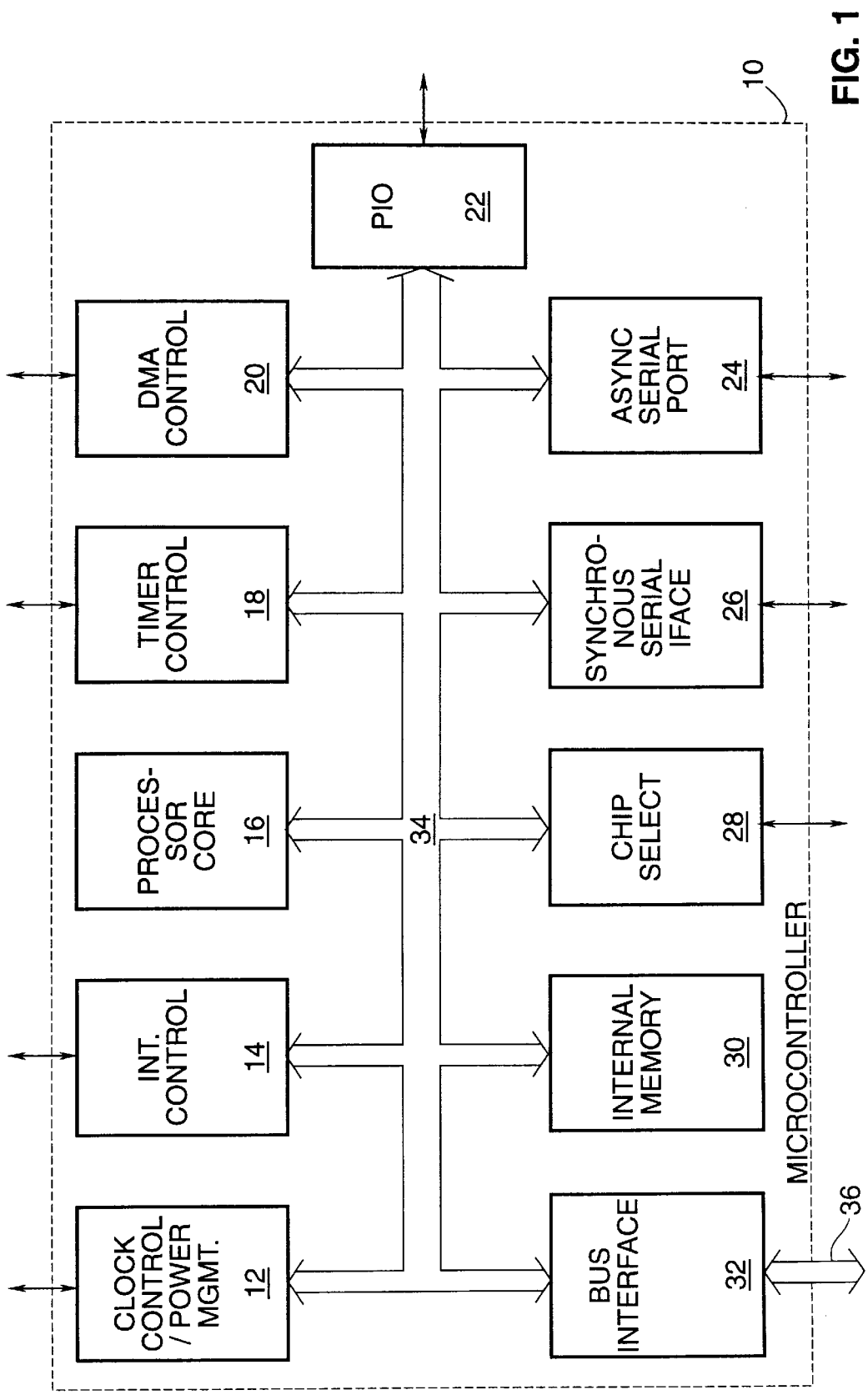
FIG. 1 is a block diagram of one embodiment of a microcontroller.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microcontroller 10 is shown. In the embodiment shown, microcontroller 10 is formed upon a single monolithic semiconductor substrate. Other embodiments are contemplated. Microcontroller 10 includes a clock/power management unit 12, an interrupt control unit 14, a processor core 16, a timer control unit 18, a DMA control unit 20, a programmable I/O unit 22, an asynchronous serial interface 24, a synchronous serial interface 26, a chip select unit 28, an internal memory 30, and a bus interface unit 32. An internal bussing 34 interconnects the various elements 12–32 of microcontroller 10 by which the various elements 12–32 communicate with each other. In one embodiment, microcontroller 10 is an 80C186-compatible microcontroller.

Processor core 16 includes circuitry for executing a set of instructions defined by the microprocessor architecture employed by processor core 16. In one embodiment, processor core 16 is an 80C186 compatible processor core. Processor core 16 fetches instructions and certain instruction operands from an internal memory 30 and from an external memory (shown in FIG. 2 below), based upon the addresses employed and the regions of the address space assigned to internal memory 30 and the external memory. If the access is to internal memory 30, then the access completes via bussing 34. For write accesses (i.e. processor core 16 is updating a memory location), the write operation and data being updated is broadcast by bus interface unit 32 upon an external bus 36. For read accesses to internal memory 30, the address is broadcast upon external bus 36 but the data being read is generally not broadcast. It is noted that the term access refers to either a read (a transfer of data from the accessed storage location to the transfer initiator, e.g. processor core 16) or a write (a transfer of data from the transfer initiator to the accessed storage location). Write accesses may also be referred to as updates.

Microcontroller 10 employs two mechanisms to aid users in debugging instruction code. First, microcontroller 10 asserts a signal upon a control pin of external bus 36 concurrent with the address being presented upon external bus 36 if the access corresponding to the address is to internal memory 30. This signal is effectively a chip select signal for internal memory 30 (e.g. an "internal chip select" signal) similar to external chip selects provided by chip select unit 28 (described further below). The internal chip select signal is multiplexed with another control signal such that a new pin is not required for microcontroller 10 to support external assertion of the internal chip select signal. As used herein, the term "multiplex" refers to the process of conveying multiple signals upon a particular pin during dissimilar time intervals. For example, the internal chip select is conveyed during a first bus cycle of a transfer while the control signal is conveyed during subsequent bus cycles. Advantageously, component costs remain fixed (since new pins are not added) even with the addition of the internal chip select signal to external bus 36. In one embodiment, external bus 36 is compatible with the 80C186 interface with the addition of a separate, 20 bit address bus for interfacing with external memory. The S6 pin may be used as the multiplexed pin for conveying the internal chip select in one exemplary embodiment. The S6 control signal is then conveyed during the subsequent bus cycles of the transfer.

The internal chip select signal may be monitored external to microcontroller 10 for debug purposes. For each access, the internal or external nature of the access may be determined. For example, if the configuration register storing the base address of the address range assigned to internal memory 30 is corrupted, a user may detect that an access which is intended to be to external memory is in fact being performed internally. This information may provide the user with clues as to the nature of the problem with the instruction code. In addition to detecting corruptions of the configuration register for internal memory 30, the user may intentional relocate internal memory 30 within the address space of microcontroller 10 (i.e. intentionally modify the bas address in the configuration register for internal memory 30). In such cases, the internal chip select signal provides an indication that the internal access is occurring even after the relocation. Therefore, a user may see that the relocation has occurred correctly. Furthermore, the internal chip select signal is always an indication of an internal memory access, regardless of the modifications which may occur to the configuration register.

Furthermore, the internal chip select signal may be used by an in-circuit emulator (ICE, shown in FIG. 2 below) to detect accesses to internal memory 30. Such detection is useful if the user has disable internal memory 30 and is using the ICE to emulate the internal memory 30. The ICE may further be emulating the entire microcontroller 10, and the internal chip select signal may be used by the emulator to perform the access internal to the ICE as well. Using the internal chip select and the external presentation of the address for reads and both the address and data for writes, the ICE can reconstruct the state of internal memory 30 externally. It is noted that an initial state of memory is needed also if internal memory 30 is a non-volatile memory.

In one embodiment, the S6 pin is further multiplexed as a PIO pin (described below). The PIO function can be used if the internal chip select and S6 control signal is not needed by the system into which microcontroller 10 is incorporated. For debugging purposes, it is possible to override selection of the PIO function by the instruction code in favor of the internal chip select and S6 control signal. In this manner, the internal chip select signal may be viewed even if the pin employed by the internal chip select signal is used by the instruction code for other purposes. The override is performed by asserting a signal upon another pin (the pin assigned to the ADEN signal in the 80C186 interface) upon deassertion of the reset signal.

Other contemplated embodiments include a programmability feature for the internal chip select pin. With the programmability feature, one of a plurality of pins may be selected to convey the internal chip select signal. In this manner, the internal chip select signal may be assigned to a pin which conveys a signal which is unused by the system into which microcontroller 10 is configured. Alternatively, the signal assigned to the selected pin may not be needed concurrent with the address. Therefore, the internal chip select may be conveyed concurrent with the address and the signal assigned to the selected pin may be conveyed during subsequent cycles of the bus transfer. Furthermore, the polarity of the internal chip select signal may be selected in accordance with external devices to be attached to microcontroller 10. The polarity of the signal defines which value constitutes asserted: high or low.

A second mechanism employed to aid users in debugging is a show read mode. The show read mode is entered if, upon deassertion of the reset signal, a signal upon a predefined pin is asserted. Alternatively, a configuration register may be programmed by a software instruction to enable the show read mode. In show read mode, when processor core 16 performs a read access to internal memory 30, the data being read from internal memory 30 is conveyed by bus interface unit 32 upon external bus 36. The data being transferred to processor core 16 from internal memory 30 thereby becomes visible external to microcontroller 10. The user may then observe the data being read and perhaps detect errors in that data. Again, additional clues as to the problem being diagnosed may be gleaned. Furthermore, it is advantageous to activate the show read mode via the predefined pin so that the instruction code being debugged need not be modified to activate the show read mode.

The functional timing of the read data upon external bus 36 is consistent with the functional timing required for external read data (e.g. data provided by an external memory). In other words, the protocol of external bus 36 is generally followed for bus transfers initiated due to the show read mode ("show read bus transfers"). In this manner, external devices (such as the ICE) may be capable of capturing the data being read using the same circuitry employed to capture external read data. Furthermore, the A/C timing of the show read bus transfers is consistent with the A/C timing of other reads. More particularly, the setup time (i.e. the amount of time prior to a particular clock edge upon which the data is captured that the data must be valid upon the bus) and the hold time (i.e. the amount of time subsequent to the particular clock edge that the data bus be valid upon the bus) are each greater than or equal to the corresponding setup and hold times for external reads. In this manner, the show read data is available at all times that normal read data is available. Still further, the control signals are operated in the same fashion as normal external reads and the setup and hold times for the control signals during show read bus transfers are consistent with the setup and hold times for normal read transfers. Advantageously, external hardware such as an ICE need not be modified in order to capture the data presented for a show read bus transfer.

Generally speaking, internal memory 30 may comprise any type of memory storage. A memory storage comprises a plurality of storage locations. Each storage location is selectable by a unique address for read and write accesses. However, in one embodiment internal memory 30 comprises 32 kilobytes of random access memory (RAM). The RAM may comprise static RAM (SRAM) cells, dynamic RAM (DRAM) cells, EEPROM cells, or flash memory cells, for example. However, any desired RAM configuration may be employed.

Bus interface unit 32 generally provides the circuitry for communicating upon external bus 36 in accordance with the protocol of the 80C186 interface. The 80C186 interface specifies a multiplexed address/data bus and related control signals. The control signals includes a command (labeled S0–S2) which identifies the type of transfer (e.g. instruction code fetch versus data access). Additionally, the control signals include read/write controls indicating the read/write nature of the access (labeled RD and WR). For write accesses, an indication of which of the two bytes is being written (or both) is included in the control signals (labeled WHB and WLB for write high byte and write low byte, respectively). Additionally, the control signals include an S6 control signal indicating whether or not an access is part of a direct memory access (DMA). Other control signals within the 80C186 interface may be included as well, as is well known in the art.

Clock control/power management unit 12 receives an input oscillating signal from an external oscillator (not shown), and generates internal and external clocking signals from the input oscillating signal. The internal and external clocking signals may operate at full speed, or may operate in a power saving mode at a lower frequency than the full speed frequency. Various algorithms for selecting the power saving mode are well known.

Interrupt control unit 14 receives interrupt signals from devices connected to microcontroller 10 ("peripheral devices"). Generally, a device interrupts microcontroller 10 when a specific service is needed by the device. For example, if a device is buffering input data and the buffer is full, the device may interrupt microcontroller 10. Microcontroller 10, in response to instructions in an interrupt service routine corresponding to the interrupt received by interrupt control unit 14, transfers data out of the buffer. In one embodiment, interrupt control unit 14 receives up to six interrupt request lines from external devices and six internal interrupt request lines (three from timer control unit 18, two from DMA control unit 20, and one from asynchronous serial port 24). Interrupt control unit 14 prioritizes the interrupts and presents the interrupts to processor core 16 one at a time. Additionally, individual interrupt requests may be programmably masked according to a user's needs.

Timer control unit 18 includes a plurality of programmable timers. The timers may be used to time certain events. Additionally, one of the timers may be used as a "watchdog timer". A "watchdog timer" is initialized by a software instruction just prior to performing an instruction or instructions which may result in an infinite hang condition (e.g. infinite loop, an instruction which never completes executing because data is never returned from an external device, etc.). The watchdog timer provides an interrupt after counting down, causing the processor core 16 to exit from the instruction code which is experiencing the infinite hang condition. The microcontroller may then proceed with other tasks.

DMA control unit 20 is configured to perform direct memory access (DMA) transfers between memory and I/O spaces or from two address ranges within one or the other of the memory and I/O spaces. Generally, DMA control unit 20 is programmed with source and destination addresses and a transfer count defining the number of bytes to be transferred. DMA control unit 20 then performs the indicated transfer. In one embodiment, DMA control unit 20 includes two DMA channels for programming two different DMA transfers.

PIO unit 22 allows programming of a set of programmable input/output (PIO) pins. A user may choose to program each individual pin as in input or output signal. The signal may be employed for any purpose according to a user's needs. Values conveyed on an output pin or received from an input pin are stored in respective locations of a register which is accessible to the user via an instruction.

Asynchronous serial port 24 provides an asynchronous serial communication mechanism compatible with industry standard RS232 specifications. On the other hand, synchronous serial interface 26 provides a synchronous communications mechanism via a synchronous serial interface including a clock pin, a data pin, and a pair of enable pins. The data pin and pair of enable pins are referenced to the clock pin.

Chip select unit 28 provides a set of external chip select signals for a variety of peripheral devices based upon a programmable memory map. Each external chip select signal is assigned to a block of memory (i.e. a contiguous range of addresses) within the addressable memory provided by microcontroller 10. Each external chip select signal is received by a particular peripheral device, and an assertion of that external chip select signal informs the particular peripheral device that the address being presented is within that peripheral device's address space (i.e. within its memory block). In one embodiment, 20 bits of address are employed, providing a 1 Mbyte address space. Each external chip select is programmed to respond to a specific range of addresses within the 1 Mbyte address space. The ranges of addresses to which the external chip selects respond do not include the range of addresses assigned to internal memory 30. In one embodiment, up to 12 external chip selects are included in accordance with 80C186 compatibility.

Figure 2:
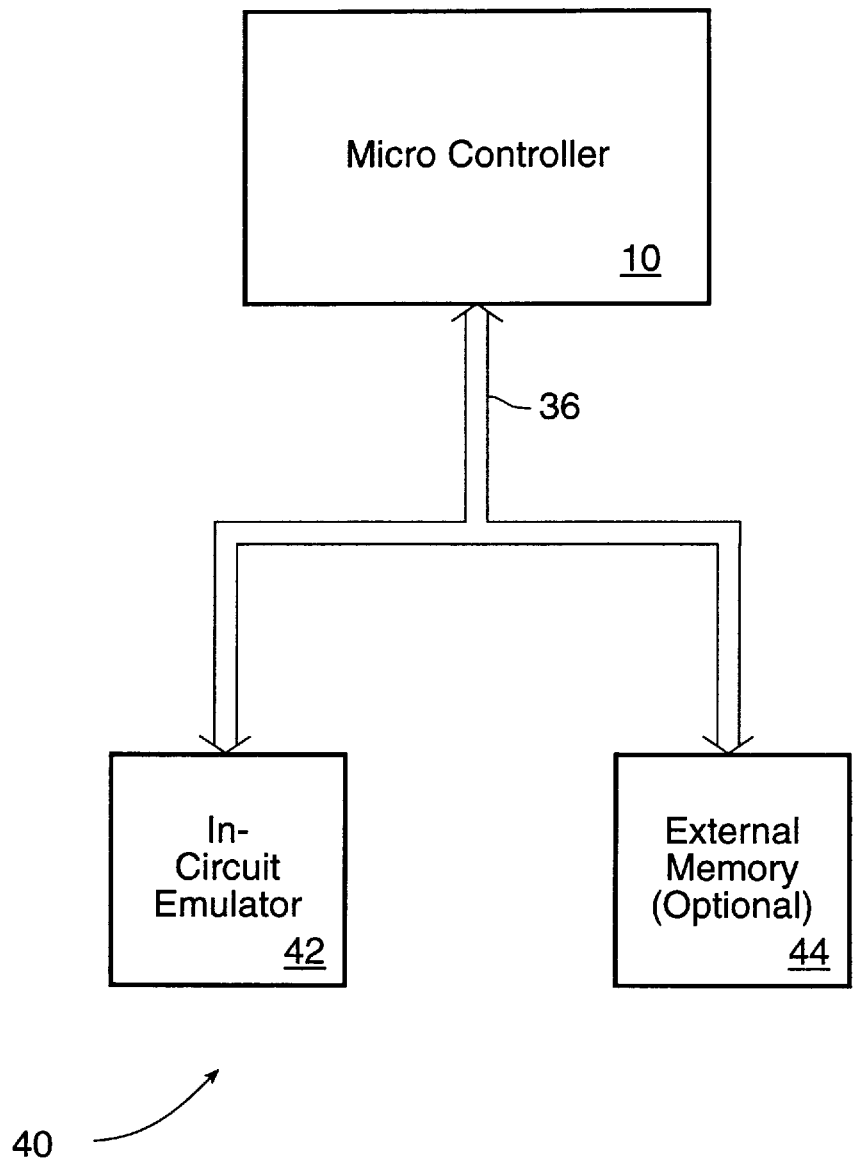
FIG. 2 is a block diagram of a system including the microcontroller shown in FIG. 1.

Turning now to FIG. 2, a block diagram of a system 40 including microcontroller 10 is shown. System 40 further includes an in-circuit emulator (ICE) 42 and an external memory 44. Microcontroller 10, ICE 42, and external memory 44 are interconnected via external bus 36. External memory 44 is an optional component. If external memory 44 is not included, then all instructions and data are read from internal memory 30 shown in FIG. 1.

In-circuit emulation techniques are well known, and any suitable ICE 42 may be employed. The external presentation of the internal chip select signal and the show read cycles may be used by ICE 42 to correctly emulate all or a portion of microcontroller 10. For example, ICE 42 may be used to emulate internal memory 30. Therefore, the internal chip select signal may be used by ICE 42 to respond to a read access. When the internal chip select is asserted, ICE 42 responds with the appropriate data. When the internal chip select is deasserted, ICE 42 does not respond. Similarly, the show read bus transfers may be used by ICE 42 if ICE 42 is emulating processor core 16.

Figure 3:
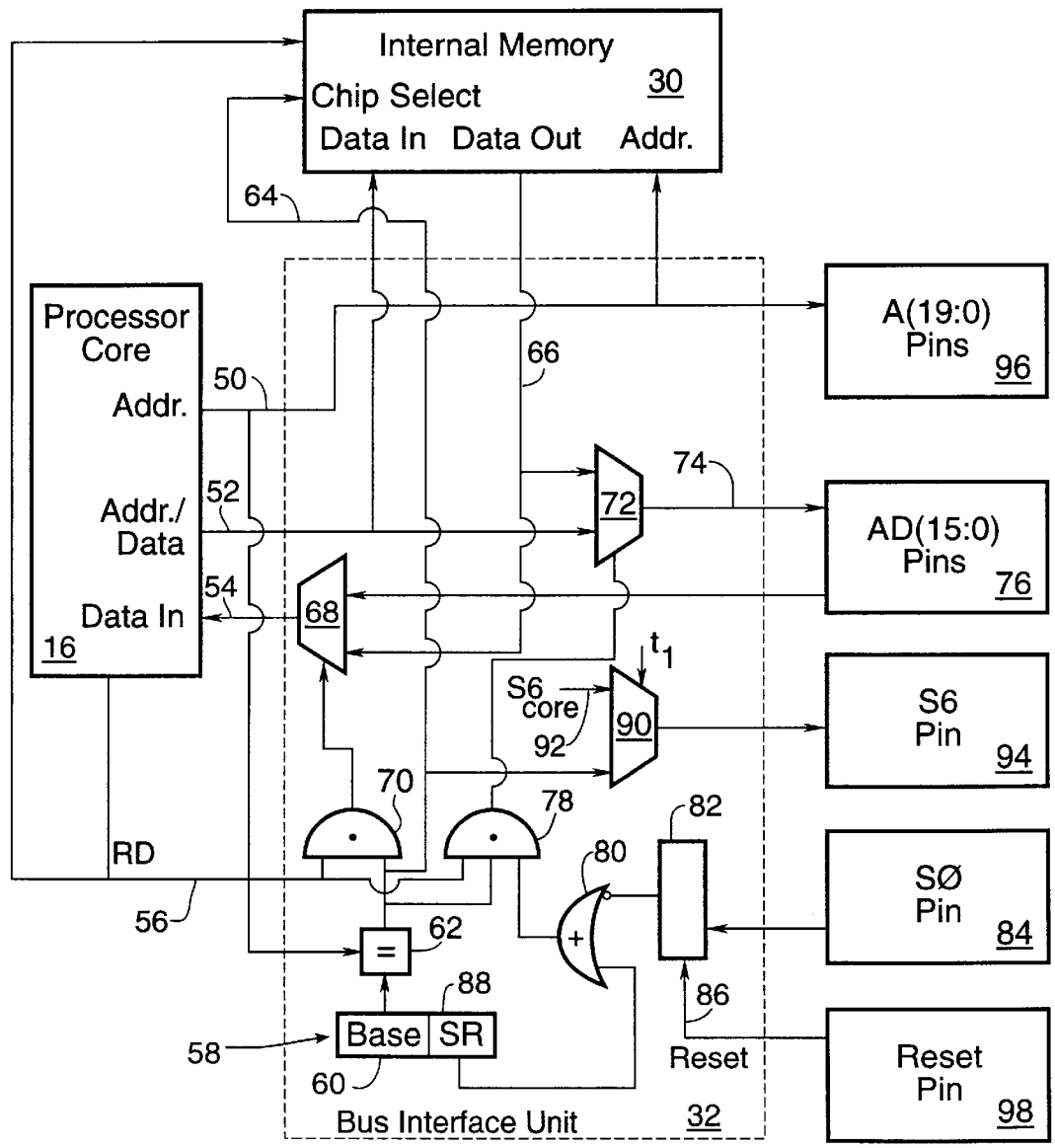
FIG. 3 is a block diagram of portions of the microcontroller shown in FIG. 1.

Turning next to FIG. 3, a block diagram showing one embodiment of a portion of microcontroller 10 in greater detail is shown for one specific implementation of microcontroller 10. Other embodiments are contemplated. FIG. 3 includes processor core 16, internal memory 30, and bus interface unit 32.

Processor core 16 provides addresses of memory accesses upon an address bus 50 as well as a processor multiplexed address/data bus 52. For write accesses, processor core 16 provides the write data upon processor multiplexed address/data bus 52. For read accesses, processor core 16 receives the read data upon a processor data input bus 54. Additionally, an indication that an access is a read is asserted upon a read line 56. Write accesses are accompanied by a deasserted indication upon read line 56. It is noted that address bus 50 is conveyed upon a set of external address pins 96 for connection to an external memory. Address bus 50 is an extension to the 80C196 interface added by microcontroller 10. Address bus 50 is driven with the address of an access throughout the entire bus transfer of that access.

Internal memory 30 receives address bus 50 from processor core 16, and uses address bus 50 to select a storage location within internal memory 30 if the address lies within the address range assigned to internal memory 30. A configuration register 58 stores a base address 60 of the memory range assigned to internal memory 30. A comparator circuit 62 compares the base address to the address conveyed upon address bus 50 (which is coupled to comparator circuit 62). In one embodiment, internal memory 30 includes 32 kilobytes of storage. For such an embodiment, the least significant 15 bits of the address provide an offset within the 32 kilobyte memory range and the remaining bits provide the identification of the 32 kilobyte memory range within the 1 Mbyte address space defined by address bus 50. In the exemplary embodiment shown, address bus 50 includes 20 bits. Therefore, the five most significant bits of the address are compared to the base address 60. Therefore, base address 60 may store only the five most significant bits and comparator circuit 62 may be a five bit comparator. The output of comparator circuit 62 is routed to internal memory 30 as an internal chip select signal upon an internal chip select line 64 for internal memory 30. Internal memory 30 further receives read line 56 in order to distinguish read accesses from write accesses.

If a read access to internal memory 30 is detected (via an asserted internal chip select signal and an asserted read signal upon read line 56), then internal memory 30 provides the data from the addressed storage location upon an internal memory data bus 66. Internal memory data bus 66 is coupled to a multiplexor 68 which drives processor data input bus 54. Additionally, an AND gate 70 provides the selection signal for multiplexer 68. AND gate 70 receives read line 56 and internal chip select line 64 as inputs. Therefore, a logical one is produced by AND gate 70 when a read access to internal memory 30 is performed. Upon receipt of the logical one upon its select input, multiplexor 68 selects the value upon internal memory data bus 66 for conveyance upon processor data input bus 54. Read data from internal memory 30 is thereby conveyed to processor core 16 for internal memory read accesses. During other cycles, the value conveyed upon external pins 76 is conveyed upon processor data input bus 54.

If a write access to internal memory 30 is performed, then the read signal upon read line 56 is deasserted while the internal chip select signal is asserted. Processor core 16 conveys the write data upon processor multiplexed address/data bus 52 during the appropriate cycle according to the 80C186 interface definition. Internal memory 30 receives the write data from processor multiplexed address/data bus 52 and stores the data into the storage location selected by the address upon address bus 50.

Read and write accesses to external memory or peripheral devices occur via external pins 96, 76, 94, and 84, as well as other external pins forming external bus 36 (not shown). Multiplexor 68 selects pins 76 for processor data input bus 54 for external read and write accesses. Additionally, multiplexor 72 selects processor multiplexed address/data bus 52 for external multiplexed address/data bus 74 for external read and write accesses.

A multiplexor 72 is provided for show read bus transfers. Internal memory data bus 66 is coupled as an input to multiplexor 72, and processor multiplexed address/data bus 52 is coupled as another input. Multiplexor 72 drives an external multiplexed address/data bus 74 which is conveyed upon external pins 76 of microcontroller 10 as part of external bus 36. In particular, external pins 76 form the multiplexed address/data bus defined by the 80C186 interface. If microcontroller 10 is in show read mode, a read access is occurring, and internal memory 30 is selected via the internal chip select signal, then internal memory data bus 66 is selected to convey a value upon external multiplexed address/data bus 74. AND gate 78 provides a logical one as a select signal to multiplexor 72 when the preceding statement is true. The read data being transferred from internal memory 30 is thereby available upon external pins 76 when microcontroller 10 is in a show read mode. Otherwise, processor multiplexed address/data bus 52 is selected to drive external multiplexed address/data bus 74. It is noted that the multiplexed address/data bus portion of external bus 36 is an input/output bus. Driver circuitry at external pins 76 is disabled if external address/data bus 74 is being driven externally (e.g. during the data portion of an external read access). It is further noted that pins 96, 76, 94, and 84 are metallic conductors upon the exterior of a package enclosing the semiconductor substrate upon which microcontroller 10 is fabricated. The package protects microcontroller 10 from the external environment, and the metallic conductors provide electrical connection to microcontroller 10 for peripheral devices. Many methods for connecting the metallic pins to the circuitry shown in FIG. 3 are well known and may be applied in the manufacture of microcontroller 10.

As noted above, show read mode may be activated in microcontroller 10 via a software-updateable bit in a configuration register and via the value on a predefined pin at the deassertion of the reset signal. An OR gate 80 provides this functionality along with a latch 82 and external S0 pin 84 in the present embodiment. In other words, external S0 pin 84 is the predefined pin in the present embodiment (S0 is a control signal in the 80C186 interface). A reset signal 86 is shown as the clock input for latch 82. Reset signal 86 is received via a reset pin 98 to microcontroller 10. Latch 82 is configured to store the value conveyed upon S0 pin 84 upon deassertion of the reset signal 86. In the embodiment shown, a logical zero value received from S0 pin 84 into latch 82 indicates that show read mode is desired. Therefore, the output of latch 82 is connected to an inverting input of OR gate 82. Furthermore, a show read bit 88 from configuration register 58 is coupled to an input of OR gate 80. In this manner, a software instruction may place microcontroller 10 into show read mode if the hardware-selected mode via S0 pin 84 is the non-show read mode (normal mode). It is noted that capturing the value of a pin at the transition of a particular signal is referred to as sampling the pin. The particular signal may be the reset signal, as in the above example, or may be a clock signal or other signal.

In the present embodiment, the multiplexed pin shared by the internal chip select signal and a control signal is the S6 pin. Multiplexor 90 is provided to select between internal chip select line 64 and a $S6_{core}$ line 92. $S6_{core}$ line 92 provides the S6 control signal defined by the 80C186 interface. The S6 control signal is normally driven upon S6 pin 94 during an entire bus transfer under the 80C186 interface, but S6 pin 94 is multiplexed between internal chip select line 64 and the S6 control signal in the present embodiment. More particularly, the internal chip select signal is presented upon S6 pin 94 during a first bus cycle of a bus transfer for an access to internal memory 30, and the S6 control signal from $S6_{core}$ line 92 is provided during the remaining bus cycles of the bus transfer. Therefore the select signal for multiplexer 90 selects the internal chip select signal during the first bus cycle of the transfer (the "$t_1$" cycle, as described further below). An indication that a given cycle is a "$t_1$" cycle is therefore used as the select line. It is noted that the select line for multiplexor 90 and the $S6_{core}$ line 92 are provided by bus interface unit 32 in response to the current bus cycle and the initiator of the bus transfer, respectively.

As used herein, the term "multiplexed address/data bus" refers to a bus which is shared by both the address and data portions of a bus transfer. The address identifies the target (write) or source (read) location of a transfer, and the data is the corresponding data for the transfer. The address is conveyed upon the multiplexed address/data bus, and then the bus is used during a subsequent bus clock cycle or cycles to convey the data. It is noted that buses 50, 52, 54, and 66 and read line 56 comprise a portion of internal bussing 34.

In one embodiment, internal memory 30 may be disabled such that all accesses are performed from an external memory. It is contemplated that internal chip select line 64 be independently disableable from internal memory 30. This feature may be useful to debugging as well: the internal memory may be disabled, but the internal chip select signal as driven upon S6 pin 94 may still reflect that the access is within the range of addresses indicated by base field 60. In this manner, an ICE may emulate the internal memory for debugging while the external assertion of the internal chip select line still indicates those accesses which are to internal memory 30 if internal memory 30 were enabled. In one embodiment, internal memory 30 may be disabled by a disable bit within configuration register 58 (not shown) or via a signal asserted at the deassertion of reset (similar to the two methods for enabling show read mode). If internal memory 30 is disabled via the disable bit, then the external assertion of the internal chip select signal is disabled as well. If internal memory 30 is disabled via the signal assertion at the deassertion of reset, the external assertion of the internal chip select signal remains enabled.

Figure 4:
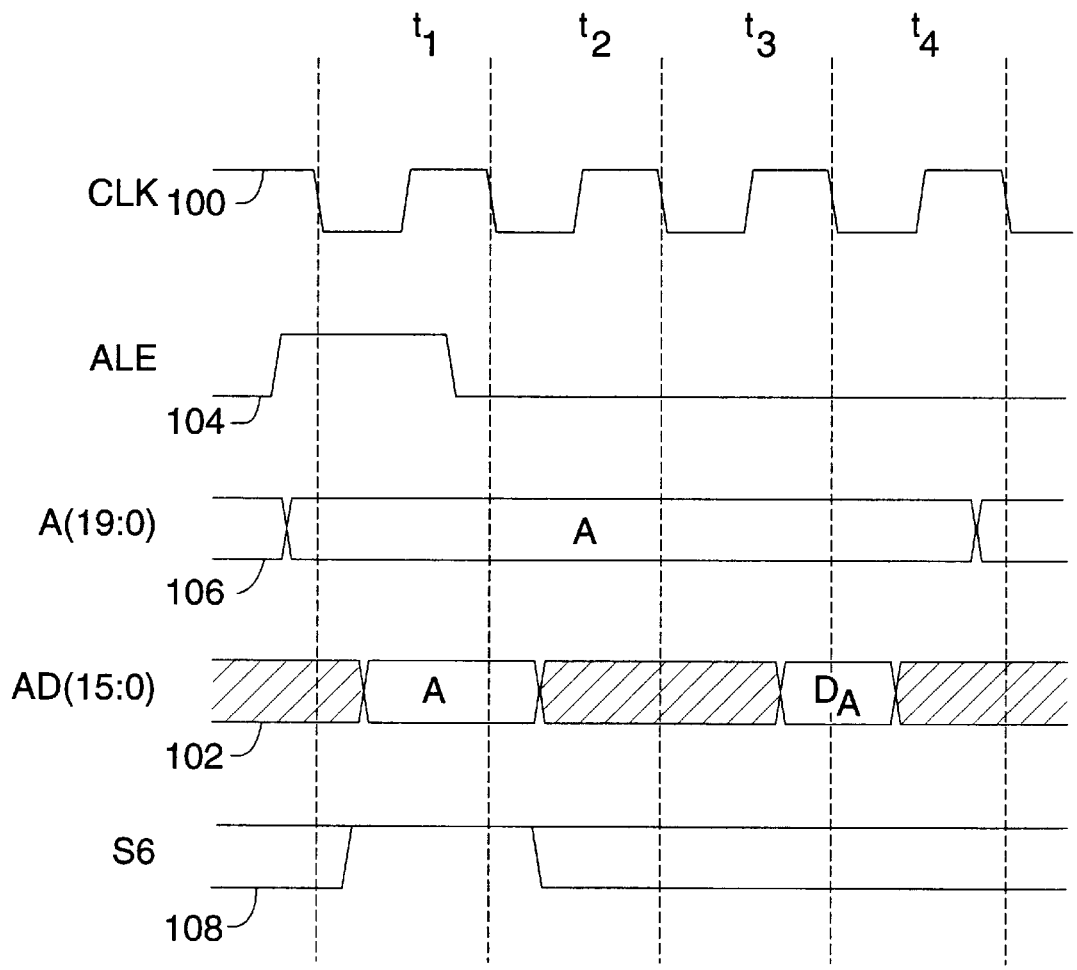
FIG. 4 is a timing diagram of an external read access for the microcontroller shown in FIG. 1, depicting the deassertion of the internal chip select signal.

Turning now to FIG. 4, a timing diagram depicting a portion of one embodiment of external bus 36 during a read access to external memory 44 is shown. Other portions of external bus 36 may operate in the normal fashion. Four bus clock cycles are depicted (labeled $t_1$ through $t_4$, separated by vertical dashed lines). The bus clock cycles are defined as one period of a clock signal 100 provided by clock control/power management unit 12. The period begins and ends at successive falling edges of clock signal 100, as indicated in FIG. 4.

The four bus clock cycles $t_1$ through $t_4$ are defined by the 80C186 interface to comprise a bus transfer. Bus clock cycle $t_1$ is the bus clock cycle in which the address is transmitted upon the multiplexed address/data bus 102. Bus clock cycle $t_2$ is used as a buffer between transmission of the address and transmission of the data. The source for the address and the source for the corresponding data may be different (e.g. a read access in which the source for the address is the master of the bus transfer and the source for the data is the slave of the bus transfer). In order to guarantee that the master and the slave of the transfer do not drive the multiplexed address/data bus 102 simultaneously, the buffer of bus clock cycle $t_2$ is inserted. Bus clock cycle $t_3$ is the bus clock cycle in which data is transferred across multiplexed address/data bus 102. Finally, bus clock cycle $t_4$ provided a buffer between the data transfer and a subsequent address transfer, which could begin as soon as the clock cycle following bus clock cycle $t_4$. It is noted that, in FIG. 4 as well as other timing diagram figures shown herein, a cross-hatched pattern shown with respect to a given bus indicates that no value is driven in that clock cycle or the value is a don't care with respect to the given bus transfer. Generally speaking, a bus transfer is the transmission of an address from a master (initiator) to a slave (responder) and the transmission of the data corresponding to that address. The transmission of the data is from the slave to the master if the bus transfer is a read; and the transmission of the data is from the master to the slave if the bus transfer is a write.

The initiation of a bus transfer is indicated by the assertion of an address latch enable (ALE) signal 104 by microcontroller 10. The address upon multiplexed address/data bus 102 becomes valid (i.e. each signal is stable at a logical one or logical zero value) prior to the falling edge of ALE signal 104. ALE signal 104 therefore identifies a bus clock cycle as bus clock cycle t1 of a bus transfer. Bus clock cycles $t_2$ through $t_4$ follow on subsequent clock cycles. It is noted that wait states may be inserted between bus clock cycle $t_2$ and bus clock cycle $t_3$ according to the needs of devices external to microcontroller 10.

Address bus 106 conveys the address corresponding to the bus transfer throughout the entire transfer. For example, bus cycles $t_1$ through $t_4$ shown in FIG. 4 have the address "A" driven upon address bus 106. Address "A" is an exemplary address within the address range assigned to external memory 44 as shown in FIG. 4. Address "A" is further conveyed upon multiplexed address/data bus 102 during bus clock cycle $t_1$. Still further, the value of the internal chip select signal is driven upon the S6 pin during bus clock cycle $t_1$ (reference number 108 in FIG. 4). Since FIG. 4 depicts a read to external memory 44, the S6 pin conveys a high signal. Chip select signals are generally asserted (or active) low, and therefore the internal chip select is deasserted as shown in FIG. 4. Generally speaking, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. During clock cycles $t_2$–$t_4$ the S6 pin conveys its normal control signal in accordance with the 80C186 interface definition.

During clock cycle $t_3$, the data corresponding to address "A" ("$D_A$" in FIG. 4) is conveyed by external memory 44 to microcontroller 10 upon multiplexed address/data bus 102. It is noted that multiplexed address/data bus 102 corresponds to pins 76 in FIG. 3. Similarly, address bus 106 corresponds to pins 96 and S6 signal 108 corresponds to S6 pin 94.

Figure 5:
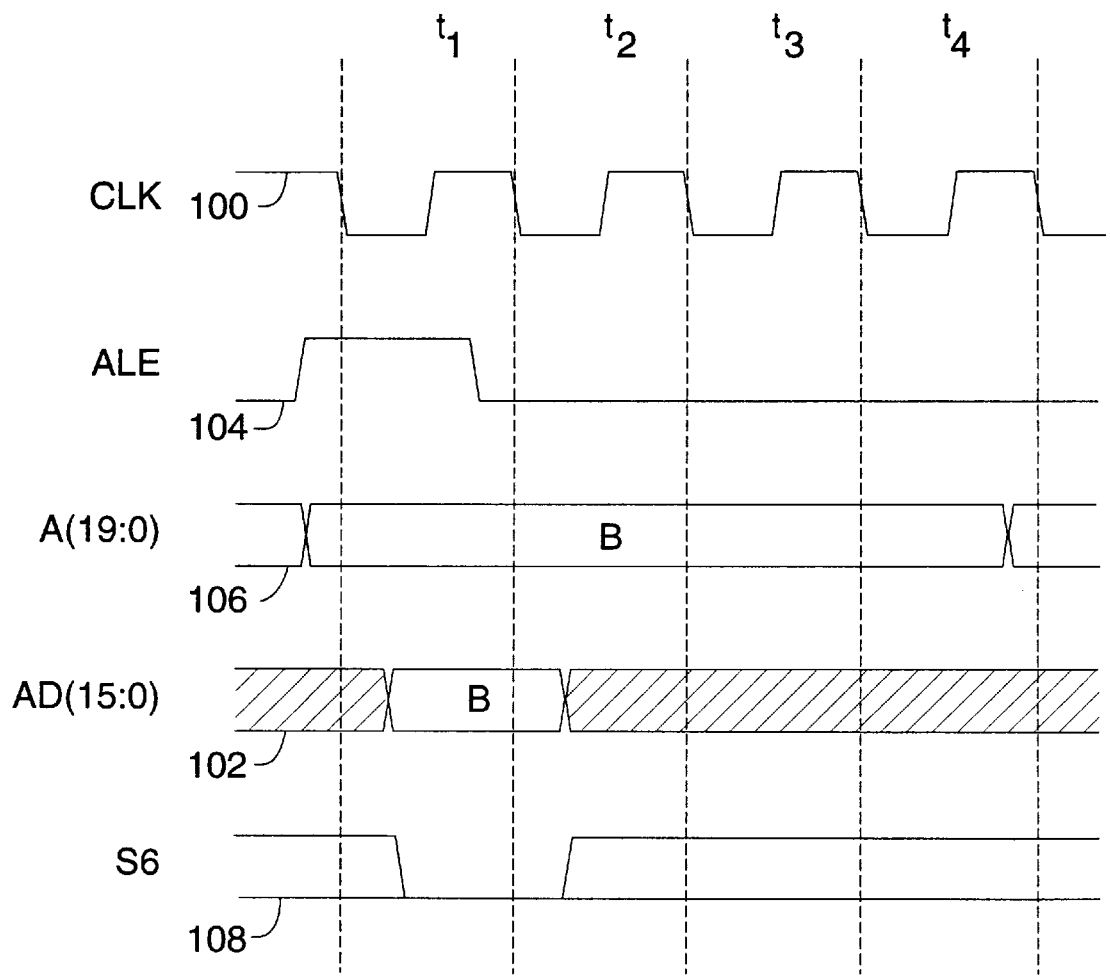
FIG. 5 is a timing diagram of an internal read access for the microcontroller shown in FIG. 1, depicting the assertion of the internal chip select signal.

Turning now to FIG. 5, a timing diagram depicting a portion of one embodiment of external bus 36 during a read access to an address "B" within internal memory 30 is shown. Other portions of external bus 36 may operate in the normal fashion. Clock signal 100, ALE signal 104, address bus 106, multiplexed address/data bus 102, and S6 pin 108 are shown.

Similar to FIG. 4, address "B" is conveyed upon address bus 106 during the entire bus transfer (e.g. bus cycles $t_1$ through $t_4$). Additionally, address "B" is conveyed upon multiplexed address/data bus 102 during bus cycle $t_1$. Dissimilar from FIG. 4, however, the S6 pin conveys a low signal indicating that the internal chip select signal is asserted.

Comparing FIGS. 4 and 5, an external memory access may be readily discerned from an internal memory access by examining the value of the S6 pin during the $t_1$ bus cycle of a bus transfer. Advantageously, internal memory accesses may be detected by observing a relatively small number of pins. The small number of pins is an advantage both for a user who may be viewing the pins upon a bus analyzer attached to external bus 36 and for a user who may be employing an ICE to perform debugging. The bus analyzer generally can only display a limited number of signals, and therefore having few signal lines needed to detect an internal memory access may allow the user to view all of the relevant signals upon the screen simultaneously. For the user employing an ICE, the fewer pins received by the ICE is an advantage in the same way that any circuit benefits from a low pin count (e.g. reduced cost, reduced complexity, etc.).

Figure 5A:
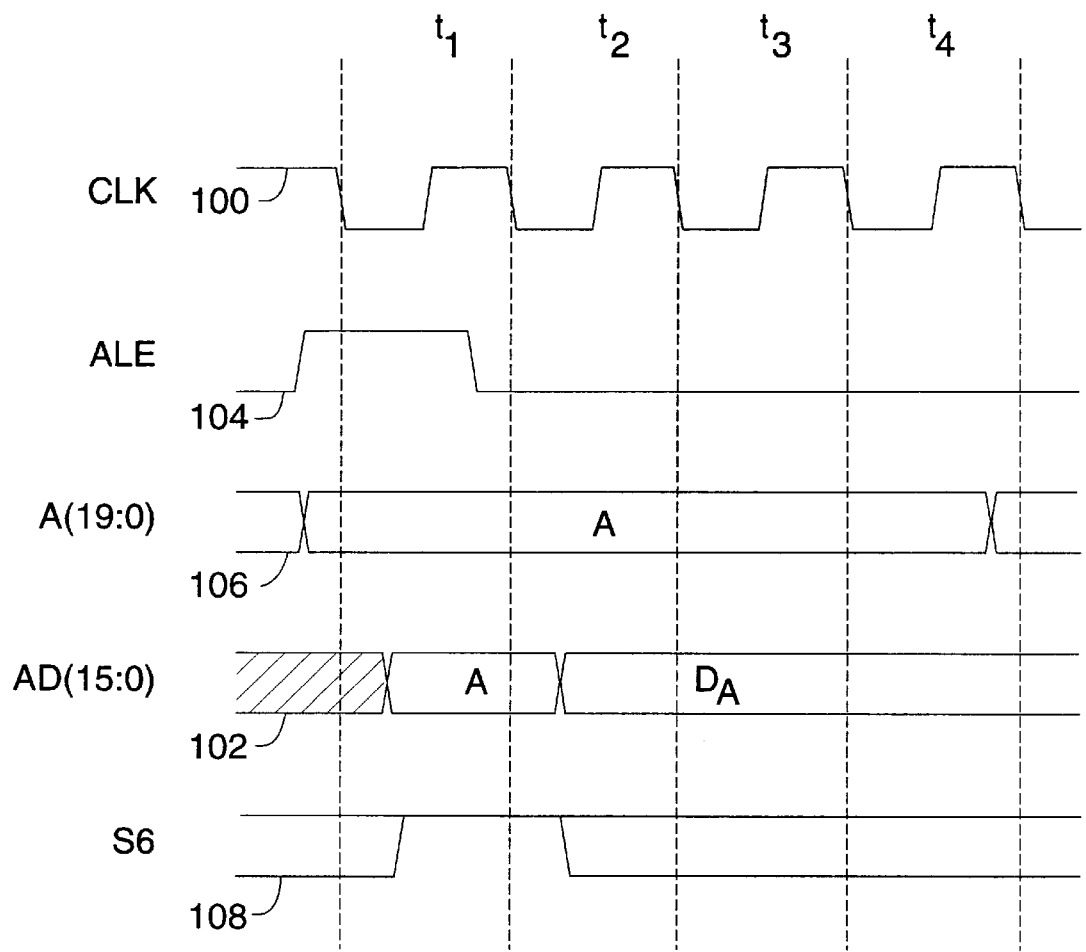
FIG. 5A is a timing diagram of an external write access for the microcontroller shown in FIG. 1, depicting the deassertion of the internal chip select signal.
Figure 5B:
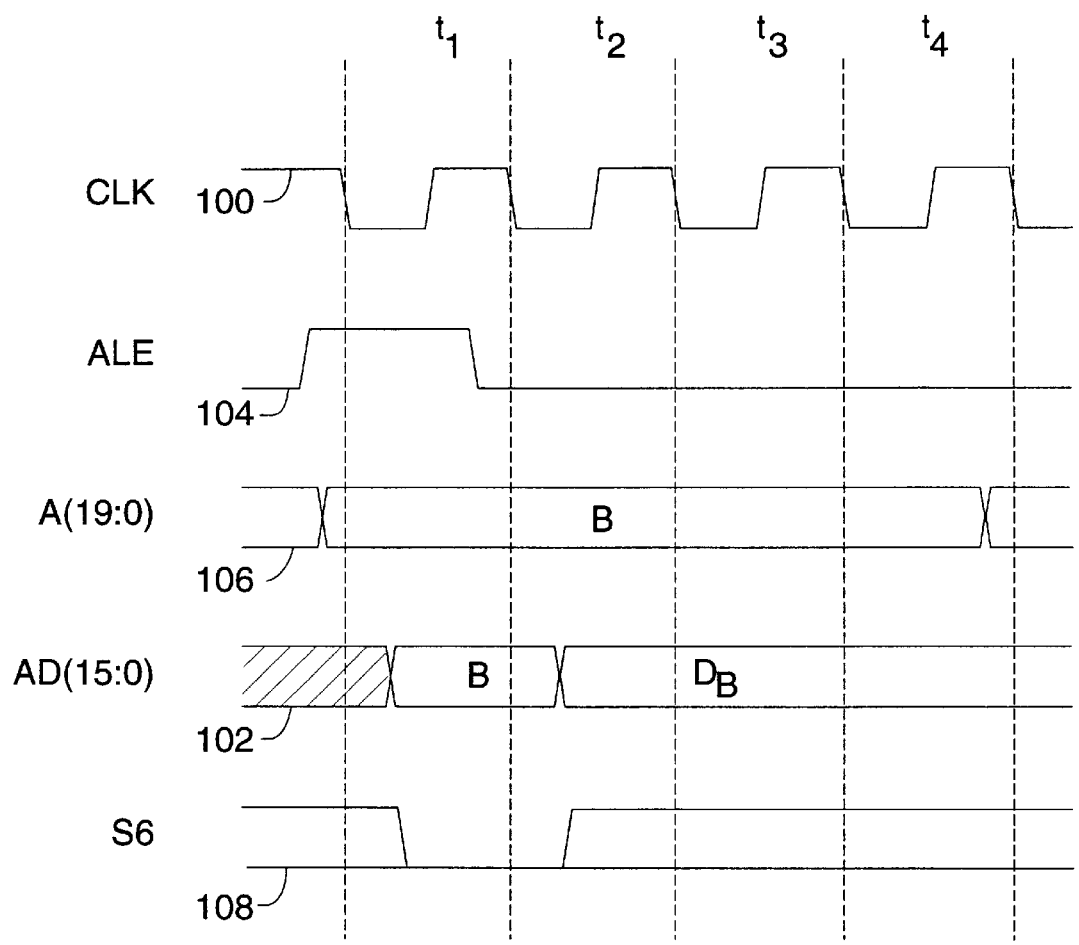
FIG. 5B is a timing diagram of an internal write access for the microcontroller shown in FIG. 1, depicting the assertion of the internal chip select signal.

The internal chip select indication is also conveyed for write accesses in a similar manner. FIG. 5A is a timing diagram depicting a portion of one embodiment of external bus 36 during a write access to an address "A" external to internal memory 30. Other portions of external bus 36 may operate in the normal fashion. Clock signal 100, ALE signal 104, address bus 106, multiplexed address/data bus 102, and S6 pin 108 are shown. Since address "A" is external to internal memory 30, the internal chip select signal is deasserted during bus clock cycle $T_1$. The data corresponding to address A is provided by microcontroller 10 (i.e. "$D_A$" shown in FIG. 5A). FIG. 5B is a timing diagram depicting a portion of one embodiment of external bus 36 during a write access to an address "B" within internal memory 30. Other portions of external bus 36 may operate in the normal fashion. Clock signal 100, ALE signal 104, address bus 106, multiplexed address/data bus 102, and S6 pin 108 are shown. Since address "B" is within internal memory 30, the internal chip select signal is asserted during bus clock cycle $t_1$. The data corresponding to address B is provided by microcontroller 10 (i.e. "$D_B$" shown in FIG. 5B).

Figure 6:
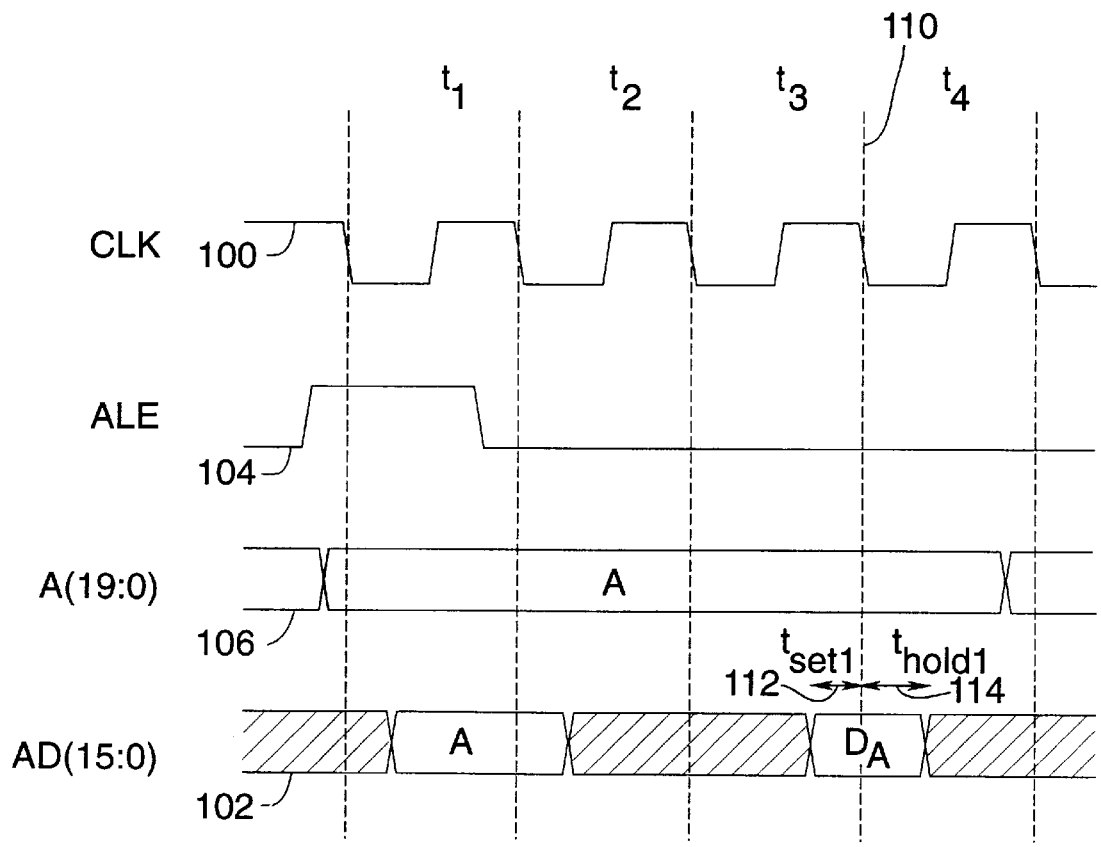
FIG. 6 is a timing diagram depicting an external read access for the microcontroller shown in FIG. 1.

Turning now to FIG. 6, a timing diagram depicting a portion of external bus 36 during a typical external read access to an address "A" having corresponding data "$D_A$" is shown. Other portions of external bus 36 may operate in the normal fashion. Clock signal 100, ALE signal 104, address bus 106, and multiplexed address/data bus 102 are shown.

As mentioned above, data is transferred to microcontroller 10 during clock cycle $t_3$. From an A/C timing specification point of view, the data must have a setup and hold time with respect to the falling edge of clock signal 100 during bus clock cycle $t_3$ (i.e. at the end of bus clock cycle $t_3$, illustrated by the vertical dashed line 110). A setup time $t_{set1}$ 112 is illustrated as the time interval between data "$D_A$" becoming valid and the falling edge of clock signal 100. Although any measurement level may be used, in one embodiment setup time is measured from a midpoint between high and low voltages (e.g. $V_{cc}$ and ground, the midpoint being $V_{cc}/2$) upon each of the signals of multiplexed address/data bus 102 to the midpoint between high and low voltages of clock signal 100. In one embodiment, $t_{set1}$ is specified as 5 nanoseconds for a 40 MHz clock signal 100 period.

Additionally, a hold time $t_{hold1}$ 114 is illustrated as the time interval between the falling edge of clock signal 100 and data "$D_A$" becoming invalid. Although any measurement level may be used, in one embodiment hold time is measured from a midpoint between high and low voltages (e.g. $V_{cc}$ and ground, the midpoint being $V_{cc}/2$) of clock signal 100 to the midpoint between high and low voltages of each of the pins of multiplexed address/data bus 102. In one embodiment, $t_{hold1}$ is specified as 2 nanoseconds for a 40 MHz clock signal 100 period.

Figure 7:
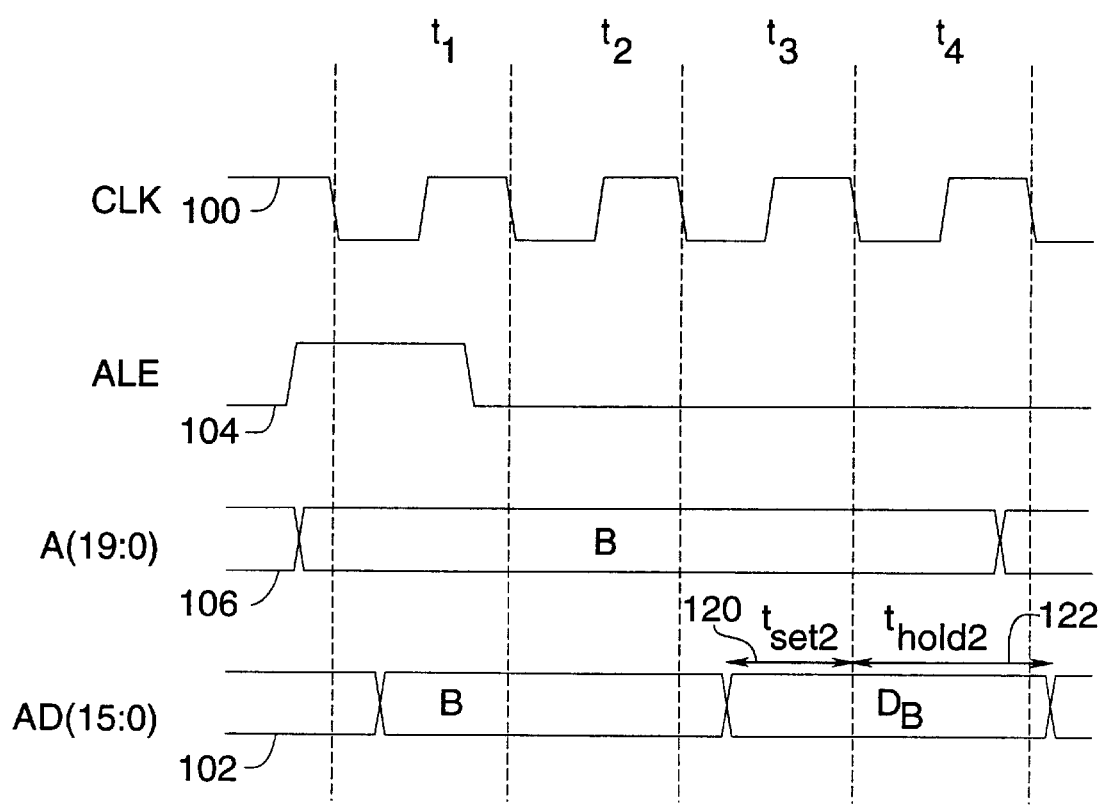
FIG. 7 is a timing diagram depicting an internal read access for the microcontroller shown in FIG. 1, when the microcontroller is in a show-read mode.

Turning now to FIG. 7, a timing diagram depicting a portion of external bus 36 during a read access to an address "B" having corresponding data "$D_B$" within internal memory 30 while microcontroller 10 is in show-read mode. Other portions of external bus 36 may operate in the normal fashion. Clock signal 100, ALE signal 104, address bus 106, and multiplexed address/data bus 102 are shown.

Address B remains valid upon multiplexed address/data bus 102 during bus clock cycle $t_2$ as shown in FIG. 7. Because microcontroller 10 is providing both the address and the data for the transfer shown in FIG. 7, it is not necessary that bus clock cycle $t_2$ be a buffer clock cycle. Embodiments are contemplated, however, in which bus clock cycle $t_2$ is a buffer cycle.

Additionally, data "$D_B$" is transmitted upon multiplexed address/data bus 102 during clock cycle $t_3$. Similar to data "$D_A$" shown in FIG. 6, data "$D_B$" is characterized by a setup time $t_{set2}$ 120 and a hold time $t_{hold2}$ 122. In order for the timing of the show read cycle to be consistent with the setup and hold times for normal read cycles (i.e. $t_{set1}$ and $t_{hold1}$), the $t_{set2}$ and $t_{hold2}$ are made to be greater than or equal to $t_{set1}$ and $t_{hold1}$, respectively. Preferably, $t_{set2}$ and $t_{hold2}$ are made significantly greater than $t_{set1}$ and $t_{hold1}$. The greater setup and hold times ease the burden of designing ICE's, for example. In one particular embodiment, $t_{set2}$ is specified as 13 nanoseconds (minimum) to 25 nanoseconds (maximum) and $t_{hold2}$ is specified as 13 nanoseconds (minimum) to 25 nanoseconds (maximum) for a 40 MHz clock signal 100 period.

The setup and hold times for the data of a show read bus transfer are therefore significantly greater than the setup and hold times for external read data. It is noted that the setup and hold times for external read data are driven by internal circuitry of microcontroller 10 used to capture the read data. Typically, these numbers are minimized to provide the system designer the greatest possible flexibility in choice and design of peripherals while still providing reliable system operation. On the other hand, the setup and hold times for the data of the show read bus transfer are driven by the internal circuitry of microcontroller 10 used to provide the data. Therefore, the setup and hold times need not be minimized and may instead be expanded to provide the system designer the greatest flexibility in capturing the show read data. In particular, the read data may be conveyed as soon as it is available from internal memory 30 and may be maintained on the bus until after the end of bus clock cycle $t_4$. Bus clock cycle $t_4$ is not needed as a buffer clock cycle in this case since in the subsequent clock cycle, the only circuit which is allowed to drive multiplexed address/data bus 102 is microcontroller 10. As mentioned above, the setup and hold times and functional timing for the control signals of external bus 36 are also consistent between normal read accesses and show read bus transfers.

Figure 8:
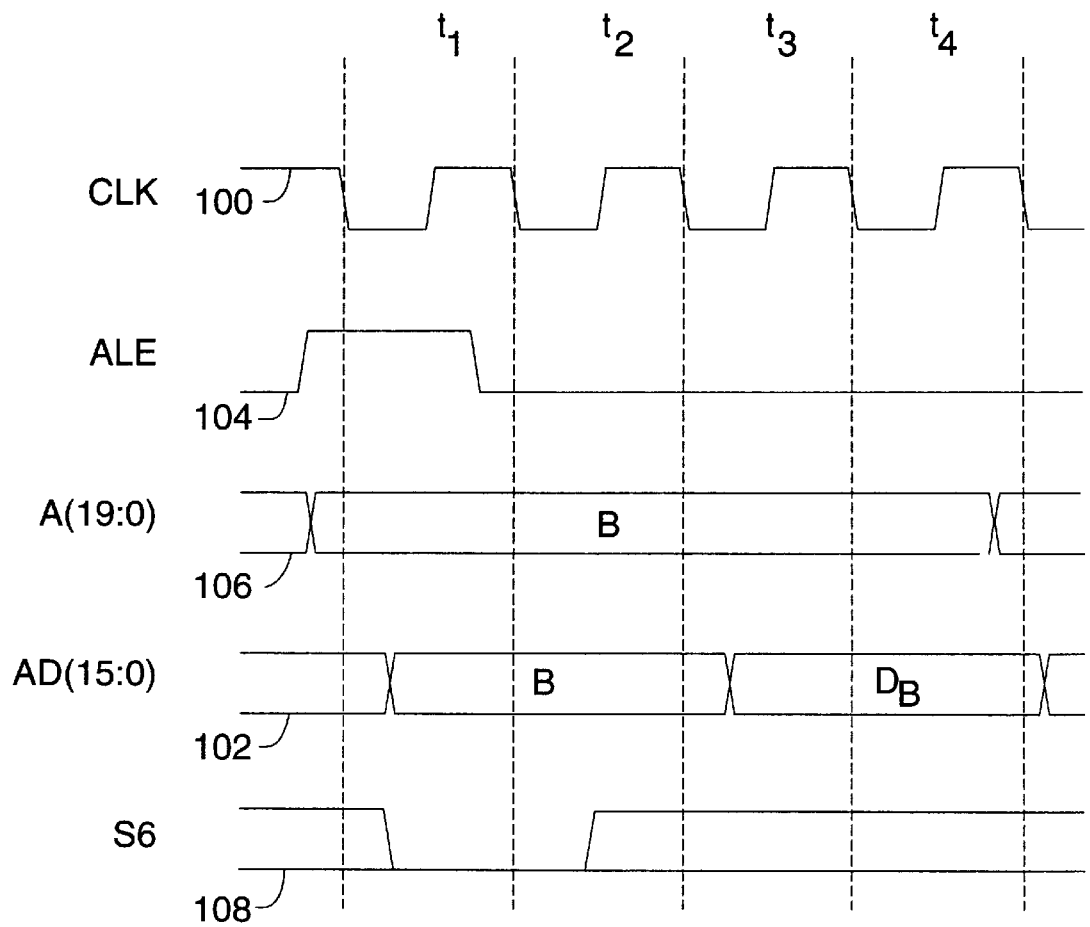
FIG. 8 is a timing diagram depicting the assertion of the internal chip select signal while the microcontroller is in a show-read mode.

Turning now to FIG. 8, a timing diagram depicting the assertion of the internal chip select signal and a show read bus transfer for a read access to an address "B" having corresponding data "$D_B$" within internal memory 30 is shown. Clock signal 100, ALE signal 104, address bus 106, multiplexed address/data bus 102, and S6 signal 108 are shown.

The external reflection of the internal chip select signal may be advantageously combined with the show read bus transfer to further simplify debugging. For example, the assertion of the internal chip select signal upon pin S6 may be used as a relatively simple triggering event upon a logic analyzer, and then the data being read may be captured at bus cycle $t_3$. Similarly, the assertion of the internal chip select signal upon pin S6 may be used by an ICE emulating internal memory 30 to detect those transfers which are targeted at internal memory 30 and to collect the corresponding data. Furthermore, the assertion of the internal chip select signal may be used as a simple warning signal to external devices that multiplexed address/data bus 102 is going to be driven in bus clock cycle $t_3$ by microcontroller 10, despite presentation of the bus transfer as a read bus transfer.

It is noted that, although microcontroller 10 as shown in FIGS. 1 and 3 employs both the external assertion of the internal chip select signal and the show read mode, either of these features may be implemented without the other in various contemplated embodiments of microcontroller 10. Furthermore, embodiments of microcontroller 10 may employ these features in conjunction with other debug features as may be desired.

Figure 9:
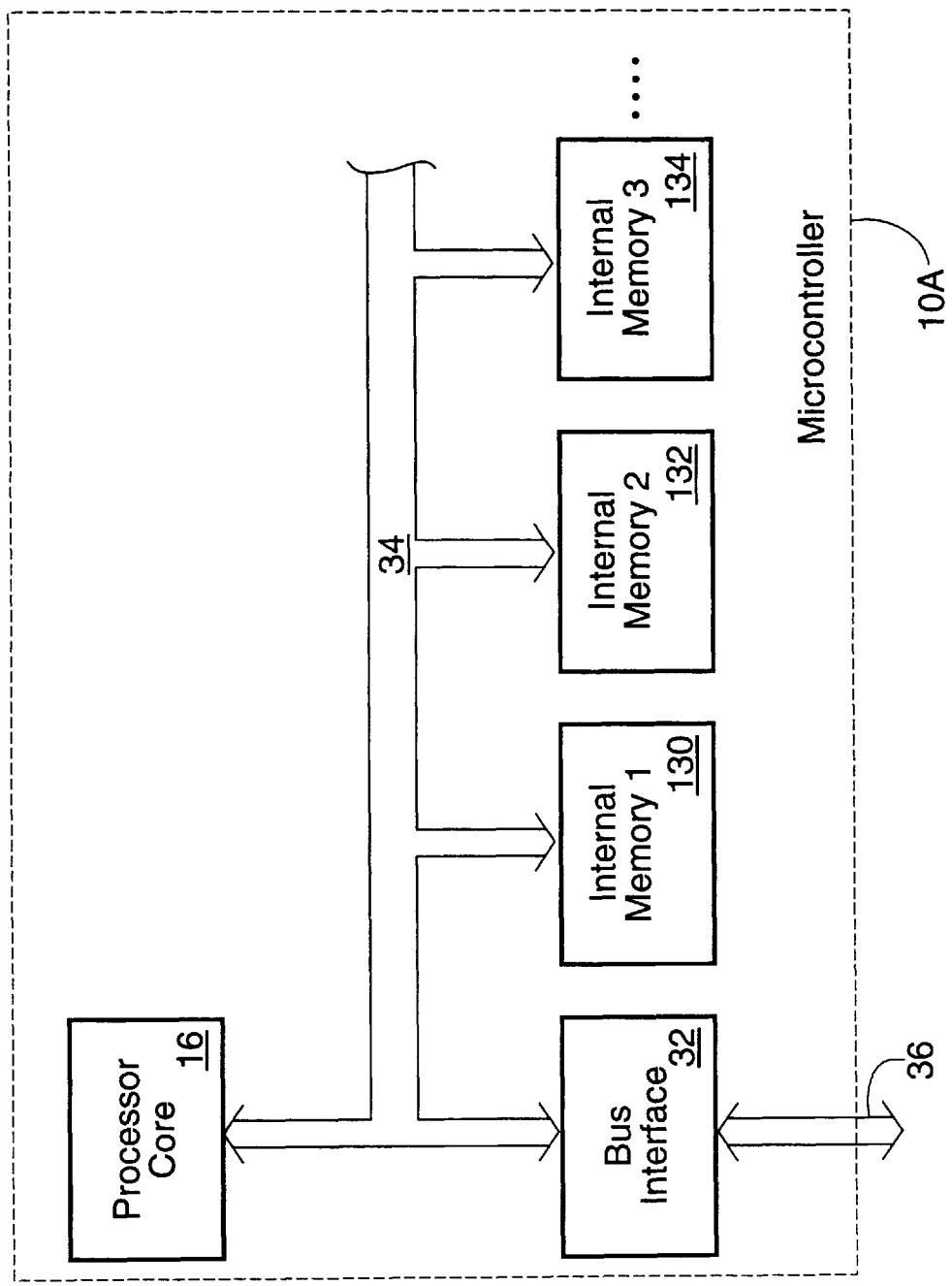
FIG. 9 is a block diagram of a second embodiment of a microcontroller, including multiple internal memories.

Turning now to FIG. 9, a second embodiment of microcontroller 10 (microcontroller 10A) is shown. Microcontroller 10A includes processor core 16 connected to internal bussing 34 and bus interface 32 connected to external bus 36 and internal bussing 34. Other elements of microcontroller 10 as shown in FIG. 1 may also be employed. Microcontroller 10A, in contrast to microcontroller 10, includes multiple independent internal memories 130, 132, and 134 connected to internal bussing 34. In the embodiment shown, the elements are formed onto a single, monolithic semiconductor substrate. Each of memories 130–134 is configured by a different configuration register identifying separate address ranges within the address space of microcontroller 10A in a manner similar to internal memory 30. Furthermore, each of memories 130–134 is selected by a separate internal chip select signal.

Figure 10:
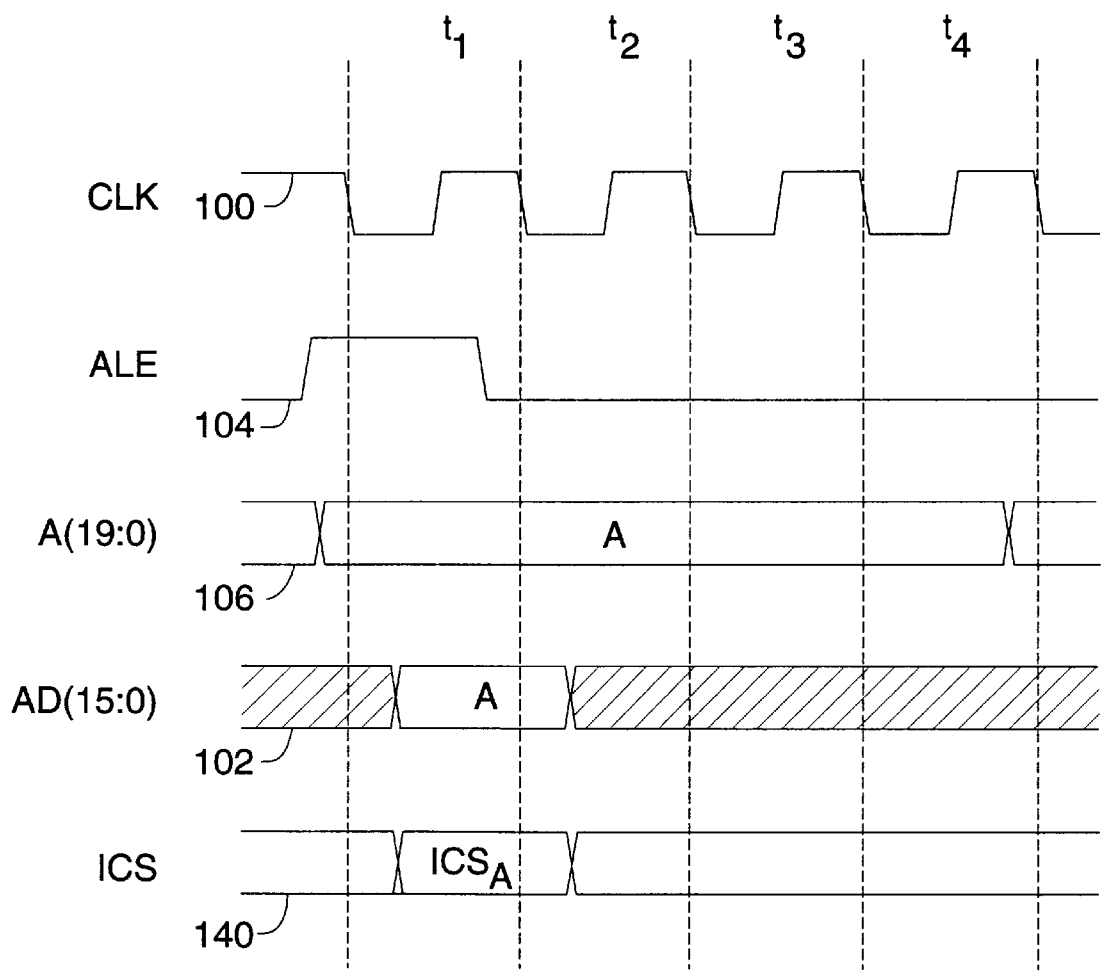
FIG. 10 is a timing diagram of the assertion of an internal chip select indication for the microcontroller shown in FIG. 9.

FIG. 10 is a timing diagram showing a portion of external bus 36 during an exemplary read bus transfer for the microcontroller 10A shown in FIG. 9. Clock signal 100, ALE signal 104, address bus 106, multiplexed address/data bus 102, and an ICS bus 140 are shown.

The read transfer shown in FIG. 10 is an access to one of internal memories 130–134 shown in FIG. 9. Therefore, during bus clock cycle $t_1$, the address "A" of the transfer is conveyed upon multiplexed address/data bus. Concurrently, an indication of the internal chip select signals is conveyed upon ICS bus 140. Similar to the embodiment of microcontroller 10 shown in FIG. 1, in which the S6 pin is multiplexed between the internal chip select signal and the normal value of the S6 pin, the pins of ICS bus 140 may be multiplexed with other control pins. The control pins revert to their original functions in bus clock cycles $t_2$ through $t_4$.

ICS bus 140 may employ a variety of encodings. For example, ICS bus 140 may include a signal line for each of the internal chip selects employed by microcontroller 10. Each of the internal chip selects is conveyed upon the corresponding signal line. Alternatively, ICS bus 140 may be encoded. For example, three internal memories 130–134 are shown in FIG. 9. Therefore, two pins may be used to encode an internal chip select for each of the internal memories as well as one encoding indicating that none of the internal chip selects is asserted. Table 1 below shows an exemplary encoding which may be employed:

TABLE 1

Exemplary ICS Bus Encoding

| Encoding (binary) | Memory Selected |
|---|---|
| 00 | none |
| 01 | Internal Memory 1 |
| 10 | Internal Memory 2 |
| 11 | Internal Memory 3 |

It is noted that any number of internal memories may be identified external via similar ICS buses 140 having sufficient signal lines.

Although the 80C186 interface and architecture has been used as an exemplary embodiment herein, the present invention is not limited to these embodiments. Any microcontroller which integrates memory may benefit from the present invention. Furthermore, any integrated circuit which integrates memory and devices which access that memory may benefit from the present invention.

In accordance with the above disclosure, a microcontroller is described which includes several debug features. The debug features aid in diagnosing code problems when all or a portion of the memory is integrated into the microcontroller. One of the features causes the value of an internal chip select indicating that the internal memory is the target of the transfer to be broadcast on the external bus of the microcontroller. Advantageously, accesses to the internal memory may be detected externally. A second feature causes read data being transferred from the internal memory to the processor core to be broadcast externally. In this manner, the data being used by program code may be monitored.

It will be appreciated by those skilled in the art having the benefit of this disclosure that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. An integrated circuit comprising:

a core;

an internal memory coupled to said core for storing data for use by said core; and a bus interface unit coupled to said core and said internal memory, wherein said bus interface unit is configured to externally indicate an access by said core to an address mapped to said internal memory, and wherein said bus interface unit is configured to indicate said access independent of an enablement/disablement status of said internal memory.

2. The integrated circuit as recited in claim 1 further comprising at least one pin coupled to said bus interface unit, wherein said bus interface unit is configured to assert a signal upon said pin to indicate said access.

3. The integrated circuit as recited in claim 2 wherein said integrated circuit is configured to programmably select said pin from a plurality of pins.

4. The integrated circuit as recited in claim 2 further comprising a second internal memory.

5. The integrated circuit as recited in claim 4 further comprising a second pin coupled to said bus interface unit, wherein said bus interface unit is configured to assert a second signal upon said second pin in response to an access to said internal memory and in response to said second internal memory.

6. The integrated circuit as recited in claim 5 wherein said signal and said second signal encode which of said internal memory and said second internal memory is being accessed.

7. The integrated circuit as recited in claim 6 wherein one encoding of said first signal and said second signal indicates a lack of access to any internal memory.

8. The integrated circuit as recited in claim 2 wherein said integrated circuit is configured to multiplex said pin between said signal and at least one third signal.

9. The integrated circuit as recited in claim 8 further comprising an address bus, and wherein said bus interface unit is configured to assert said signal upon said pin concurrent with a conveyance of an address corresponding to said access upon said address bus.

10. The integrated circuit as recited in claim 9 wherein said address bus comprises a multiplexed address/data bus.

11. The integrated circuit as recited in claim 10 wherein, if said access is a write access, said bus interface unit is configured to convey data corresponding to said write access upon said multiplexed address/data bus.

12. The integrated circuit as recited in claim 9 further comprising a plurality of pins upon which said bus interface unit is configured to convey a plurality of control signals during said access, wherein said plurality of control signals are provided concurrent with and in addition to said signal.

13. The integrated circuit as recited in claim 1 wherein said core comprises a processor core.

14. A method for operating an integrated circuit comprising:

accessing an address mapped to a memory internal to said integrated circuit; and indicating said accessing upon at least one pin of said integrated circuit, said indicating independent of an enablement/disablement status of said memory internal to said integrated circuit.

15. The method as recited in claim 14 wherein said indicating comprises asserting a signal upon said pin coincident with presenting an address upon an address bus of said integrated circuit.

16. The method as recited in claim 15 wherein said address identifies a memory location being accessed within said memory.

17. The method as recited in claim 15 further comprising conveying a second signal upon said pin after asserting said signal.

18. The method as recited in claim 14 wherein said indicating further comprises indicating upon a plurality of pins including said pin that said memory is being accessed.

19. The method as recited in claim 18 wherein said integrated circuit comprises a plurality of memories internal to said integrated circuit including said memory, further comprising indicating which of said plurality of memories is being accessed upon said plurality of pins.

20. The method as recited in claim 14 further comprising accessing a second memory external to said integrated circuit.

21. The method as recited in claim 20 further comprising indicating upon said pin that said second memory is being accessed.

22. A system comprising:

an external memory; and an integrated circuit coupled to said external memory, wherein said integrated circuit includes an internal memory, and wherein said integrated circuit comprises at least one pin upon which said integrated circuit indicates an access to an address mapped to said internal memory, and wherein said integrated circuit is configured to indicate said access independent of an enablement/disablement status of said internal memory.

23. The system as recited in claim 22 wherein said integrated circuit is configured to assert a signal upon said pin coincident with presenting an address corresponding to said access upon an address bus, and wherein said integrated circuit is configured to deassert said signal upon said pin coincident with presenting a second address corresponding to a second access to said external memory.

* * * * *